(No Model.)
D. F. OLIVER.
LAMP SUPPORT.
No. 488,971. Patented Dec. 27, 1892.
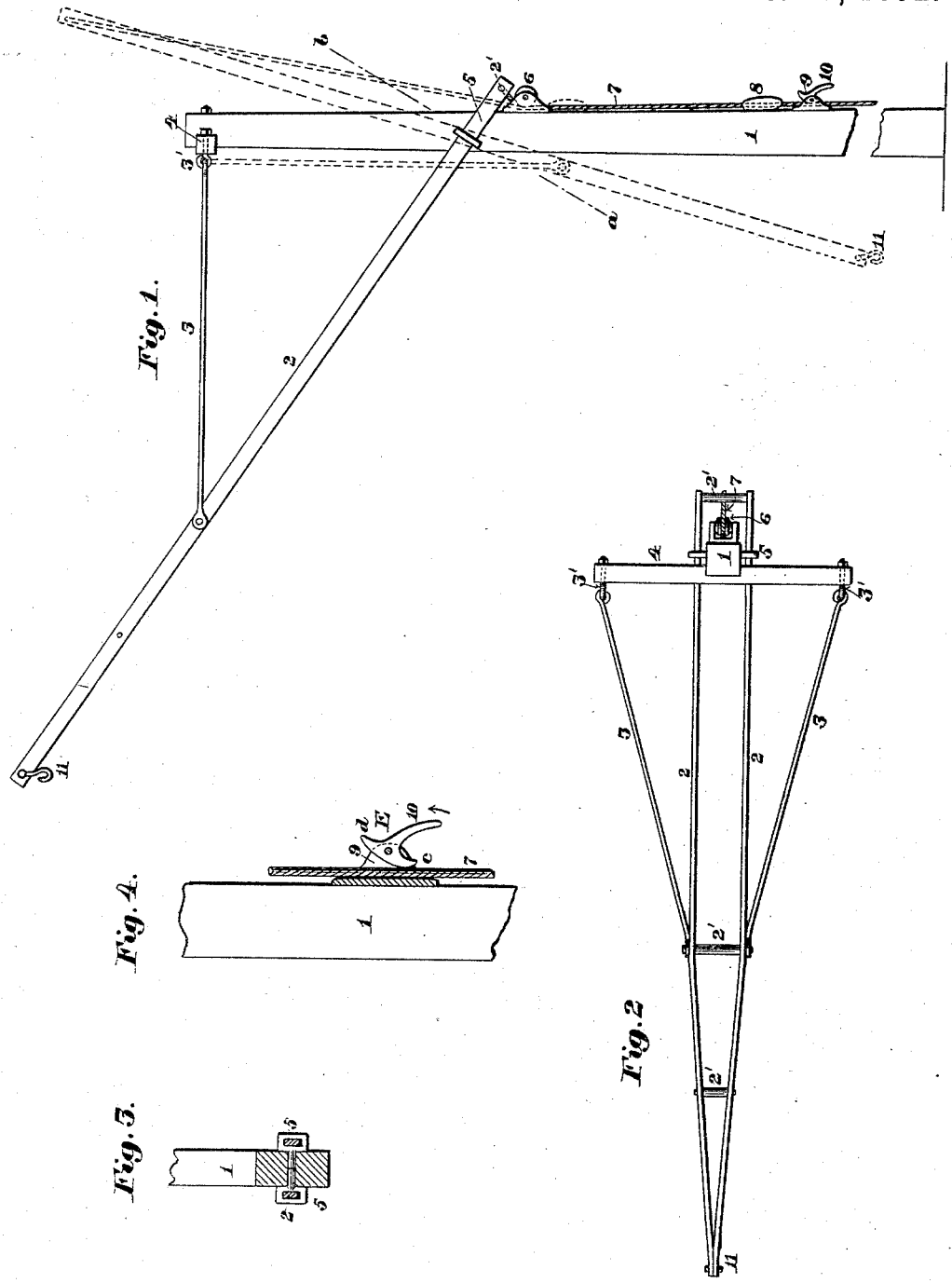
Witnesses:
Clyde M. Shady
Mae McKee
Inventor:
Doctor Franklin Oliver

UNITED STATES PATENT OFFICE.

DOCTOR FRANKLIN OLIVER, OF OAKLAND, CALIFORNIA.

LAMP-SUPPORT.

SPECIFICATION forming part of Letters Patent No. 488,971, dated December 27, 1892.

Application filed December 8, 1891. Serial No. 414,443. (No model.)

*To all whom it may concern:*

Be it known that I, DOCTOR FRANKLIN OLIVER, a citizen of the United States, residing at Oakland, Alameda county, State of California, have invented an Improvement in Lamp-Supports; and I hereby declare the following to be a full, clear, and exact description of the same.

My invention relates to the class of lamp supports, and especially to those used for supporting electric lamps for street lighting purposes.

It consists in the novel construction, arrangement and combination of parts hereinafter fully described and specifically pointed out in the claims.

The general object of my invention is to provide a simple and efficient means for suspending lamps at a suitable distance from a mast; and also to lower and elevate same.

Referring to the accompanying drawings for a more complete explanation of my invention, Figure 1.—is a side elevation. Fig. 2.—top view of same. Fig. 3.—sectional view of arm, mast and guide staples, on line A, B. Fig. 4.—sectional view of clutch for holding rope 7.

1, is the mast or pole.

2, is the arm, which is composed of two bars of suitable material, preferably steel, of suitable length and size. The bars 2, 2, are secured together in pairs, having spreaders 2' between, through which passes a bolt which securely holds the members together: at a point near the middle of the arm, the members are slightly bent and converge to a common point at their outer ends, to which is attached the lamp hook 11. At a point near its middle are pivoted suitable supporting rods 3, which extend to the eye-bolts 3' secured to cross-arm 4, carried by the mast as shown. The mast is further provided with a pulley 6, mounted upon the rear side; also the guide-loops 5, which are threaded at their stem portion, which are inserted in a lateral perforation in the mast. Through the loop of these guide-loops pass the members 2 of the arm, which are designed to freely slide therein. To the spreader 2' at the rear end of the arm, is attached a rope 7, which passes over pulley 6 and downward through clutch 9 secured to the mast below. At a suitable point between the pulley and the clutch may be attached a weight 8.

The clutch is composed of the perforated holder, 9, bolted to the mast, through which passes the rope 7, and the lever 10 of clutch, pivoted between the jaws of the clutch casting 9, as shown. It will be seen that when rope 7 is drawn downward through holder 9, that the point "C" of lever 10, will bear only lightly against rope, but when the rope is released and its tendency being upward, and the point "C" of lever 10, by the gravity of the lever, comes in contact with rope 7, the result will be to securely clamp the rope and prevent its further upward movement. By the end of lever 10 being thrown suddenly upward (indicated by arrow) to point "E," point "C" will be removed from contact with rope 7, simultaneously the point "D," will come in contact with rope 7 and act as a friction graduator, which prevents rope from passing too rapidly upward, thus lowering arm at the desired speed. Now it will be seen that, inasmuch as the arm is loosely poised in the guide-loops 5, which pivot in the mast, and the rods, 3, being pivoted at their ends, if the rope 7 is released from the clutch 10, the arm will, (by force of gravity,) travel rearwardly in the direction of its length, and as the ends of rods 3 where pivoted to the arm, travel downward until they reach a point lower than the guide loops, the result will be to bring the arm in an inverted vertically inclined position, as shown by dotted lines; thereby lowering the lamp a distance equal to almost the entire length of the arm, thereby dispensing with much climbing necessary to reach the lamp. By drawing upon rope 7 the arm will be raised to its normal position and secured by the action of the clutch on rope 7. To better balance the arm and equalize the power necessary for its operation, I provide a suitable weight, 8, suspended by rope 7, at a point between the clutch and pulley 6. It will be further observed that when the arm is lowered the rope 7, by virtue of the weight 8, draws upon the arm almost in line with rods 3 (dotted lines), thereby exerting but little force; but, as the lamp is being elevated and the resistance increases, then, by reason of the rear end of arm occupying a position nearly at right angle with the mast, at a point where the pulley is attached, the rope 7 will exert a power fully equal to the weight 8, thereby rendering the arm well balanced in its movement.

Having thus fully described my invention, what I claim as new, and desire to secure by Letters Patent is:

1. In a lamp support, in combination with a mast carrying a cross-arm, the slidable arm supported by the pivoted rods extending from the middle portion of the arm to the cross-arm, the guide staples supporting the rear end of the arm, said staples being pivotedly secured to the mast, and mechanism for operating the arm; substantially as described.

2. In a lamp support, in combination with the mast having a cross-arm, the pulley mounted upon the mast, the guide-loop bolts 5, pivoted in the mast, the slidable arm adapted to travel in said guide-loops, the supporting rods for said arm and mechanism for operating it, substantially as described.

3. In a "lamp support," in combination with a mast its cross arm, the pulley mounted upon the mast, staple guides secured to the mast, the slidable arm adapted to travel in said guides, said arm being composed of separated members 2, 2, having the spreaders 2' bolted between, its supporting rods, the rope attached to its rear end, passing over the pulley and secured by a clutch on the mast substantially as described.

4. In a lamp support, in combination with a mast carrying a cross arm, the pulley, guide staples and clutch secured to the mast, the slidable arm poised in the guide staples, the supporting rods pivoted to the arm and cross arm, the operating rope secured to rear end of arm and passing over pulley attached to mast, the counter-balancing weight attached to rope adapted to graduate the movement of the arm, for the purpose set forth substantially as described.

5. In a lamp support, in combination with a mast and cross arm, the pulley, guide staples and clutch secured to the mast, the slidable arm poised in the guide staples, the supporting rods pivoted to the arm and cross arm, the operating rope attached to rear end of arm and passing over the pulley secured to the mast, and through the clutch secured to the mast, said clutch having the hand lever 10 provided with the "clutch point" "C" and the "friction point" "D" for controlling the rope, substantially as described.

6. In a lamp support, in combination with a mast and cross arm, the pulley, guide staples and clutch secured to the mast, the slidable arm poised in the guide staples, the supporting rods pivoted to the arm and cross arm, the operating rope attached to rear end of the arm and passing over the pulley secured to the mast, and through the clutch secured to the mast, said clutch having the hand lever 10 provided with the "clutch point" "C" and the "friction point" "D" for controlling the rope and the counter-balancing weight, for graduating the movement of the arm substantially as set forth and described.

In testimony whereof I hereunto set my hand and seal in the presence of two witnesses.

DOCTOR FRANKLIN OLIVER. [L. S.]

Witnesses:
HARRY THOMPSON,
NEWTON BENEDICT.